H. T. AYDELOTT.
ATTACHMENT FOR STEAM LOCOMOTIVES.
APPLICATION FILED MAR. 30, 1911.
1,038,515.
Patented Sept. 17, 1912.
2 SHEETS—SHEET 1.
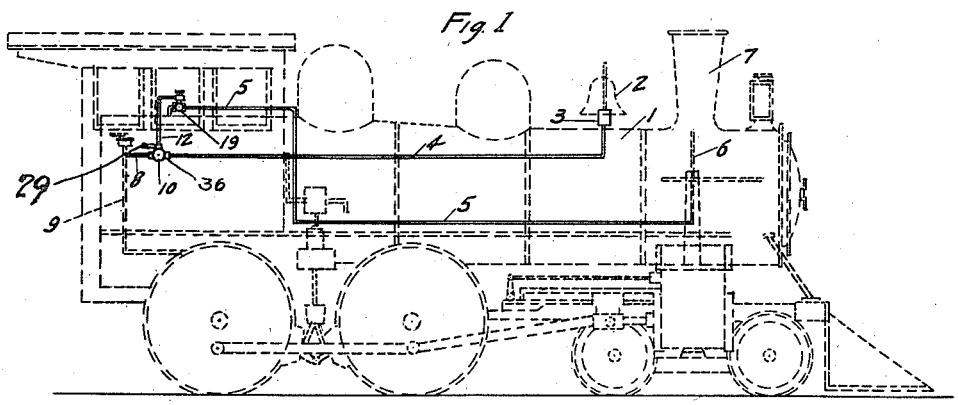
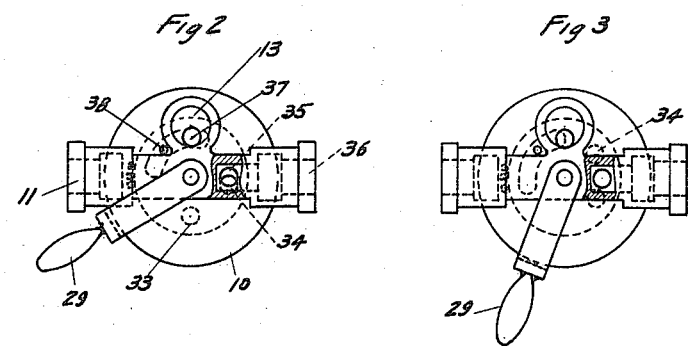
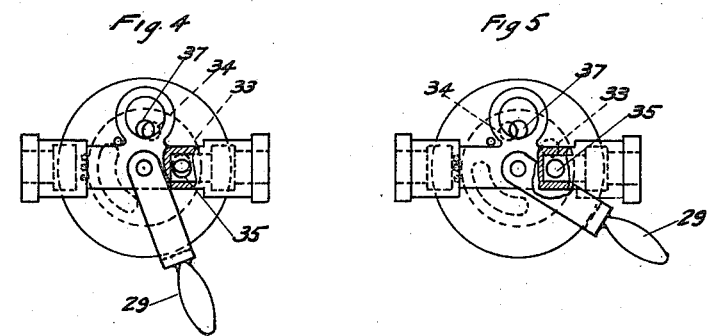
WITNESSES
INVENTOR
H. T. AYDELOTT
BY
ATTORNEY H. T. AYDELOTT.
ATTACHMENT FOR STEAM LOCOMOTIVES.
APPLICATION FILED MAR. 30, 1911.
1,038,515.
Patented Sept. 17, 1912.
2 SHEETS—SHEET 2.
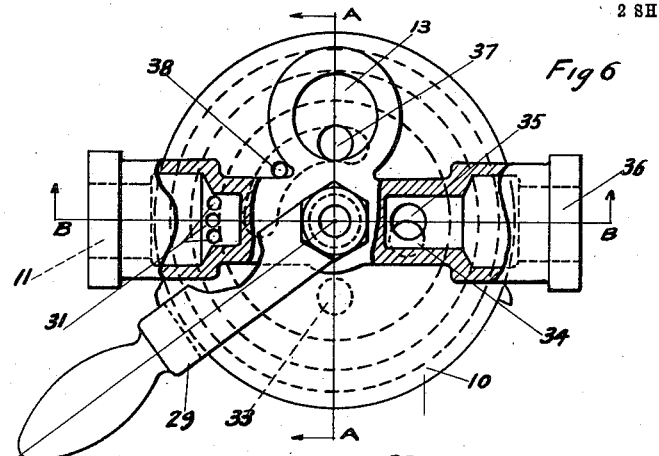
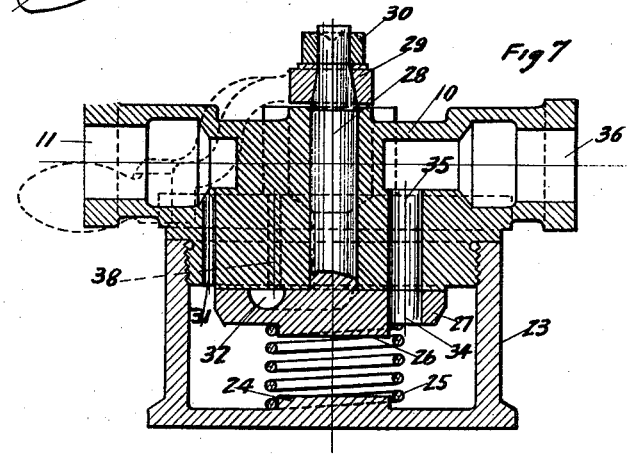
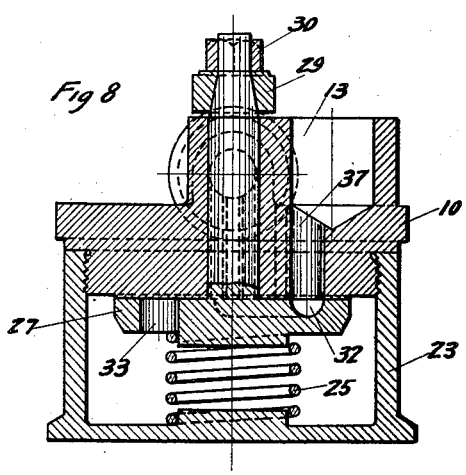
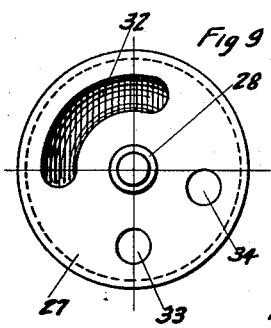
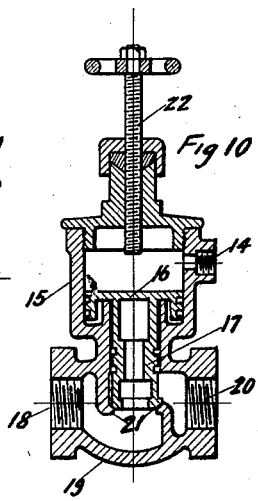
WITNESSES
INVENTOR
H. T. Aydelott
BY
ATTORNEY

UNITED STATES PATENT OFFICE.

HALSTEAD T. AYDELOTT, OF BIRMINGHAM, ALABAMA.

ATTACHMENT FOR STEAM-LOCOMOTIVES.

1,038,515. Specification of Letters Patent. Patented Sept. 17, 1912.

Application filed March 30, 1911. Serial No. 617,828.

*To all whom it may concern:*

Be it known that I, HALSTEAD T. AYDELOTT, a citizen of the United States, residing at Birmingham, in the county of Jefferson and State of Alabama, have invented new and useful Improvements in Attachments for Steam-Locomotives, of which the following is a specification.

My invention relates to an improvement in attachments for steam locomotives and has for its object to provide a means whereby the engineer may with a single valve mechanism control the operation of both the bell ringer and the steam blower for creating a draft in the locomotive stack.

The various municipal laws regulating the ringing of bells and the prevention of smoke have greatly increased the burden of running a locomotive engine. Steam or air actuated bell ringing mechanisms have been devised and also steam blowers have been provided in the stack so that when turned on the draft may be regulated to prevent the locomotive producing smoke to any substantial extent while in stations or passing through towns or cities. Both the bell ringer mechanism and the blower have been controlled by separate valves whereby the engineer is required to reach to different parts of the engine and laboriously turn a screw valve to control the fluid pressure in the pipe line leading to the bell ringer or the blower mechanism, and in doing so he is required to take his eye from the track at the very time when it is most important that his attention should not be diverted, namely, when entering stations or when passing through towns. The annoyance and danger resulting from the use of the present separate and cumbersome valve mechanisms has proven the necessity for the invention of a single, compact and quickly operated mechanism which is capable of being adjusted to different operating positions to operate either the bell ringer or the blower alone, or to simultaneously operate both the bell ringer and blower, or cut them out of service. This single valve mechanism is conveniently placed in the locomotive cab and is so designed that it may be operated by the engineer quickly, easily and without taking his eye from the track.

My invention comprises the details of construction and arrangement of parts which are more fully described and claimed hereinafter, reference being had to the accompanying drawings, in which:—

Figure 1 is a side elevation of the locomotive engine equipped with my valve attachment. Figs. 2, 3, 4 and 5 show the valve attachment in its several operating positions. Fig. 6 is an enlarged detail plan view of the valve partly broken away. Fig. 7 is a transverse sectional view through the line B—B of Fig. 6. Fig. 8 is a similar sectional view taken along the line A—A of Fig. 7. Fig. 9 is a detail plan view of the valve face. Fig. 10 is a vertical sectional view of the air controlled valve mechanism for the steam blower pipe.

Similar reference numerals refer to similar parts throughout the drawings.

The locomotive 1 is provided with a bell 2 and any suitable fluid pressure operated bell ringing mechanism 3, the details of which are not shown as they form no part of my present invention. The fluid pressure to operate the mechanism 3 is conveyed through a pipe 4 leading along the locomotive boiler. A steam pipe 5 also leads along the boiler and passing into the forward end thereof, terminates in a blower pipe 6 which projects up toward and in line with the locomotive stack 7. A pipe 8 is connected to any source of fluid pressure supply, preferably to a pipe 9 connected to the main reservoir (not shown) of the air system. This pipe 8 connects with a valve casing head 10, being screwed into the port 11 thereof. A pipe 12 leads from a port 13 at the side of the casing head 10 to a port 14 which enters the upper end of a cylinder 15 (Fig. 10). A differential piston 16 in this cylinder operates a piston valve 17 adapted to cut off steam, which flows from the boiler to the port 18, from passing through the valve casing 19 to port 20 thereof with which pipe 5 connects. The steam pressure normally tends to raise the valve from its seat 21 unless held against its seat by the hand screw 22 or by pressure above the piston 16 which, due to its differential character, would overcome the steam pressure below and hold the valve closed.

The engineer may desire to simultaneously admit fluid pressure to the pipes 4 and 5, or to cut off pressure from said pipes, or to admit pressure to either of the pipes. To this end I have devised a simple and effective controlling valve mechanism which is illustrated in detail in Figs. 6 to 9. The valve mechanism comprises the casing head 10 that screws into a cylindrical chamber 23, which chamber has a stud 24 in the bottom thereof to receive and position a coil spring 25 that at its upper end surrounds a circular stud or projection 26 on the bottom of a rotary disk valve 27. This valve is provided with a central pin or stud 28 which passes up through a suitably packed opening in the head 10 and has connected to its outer end a handle 29 which is held in position thereon by a nut 30. The spring 25 urges the rotary disk valve against the bottom face of the head 10 and the valve and head are provided with the arrangement of ports which will now be described. The fluid pressure entering through the port 11 passes down through a series of ports 31 into the casing 23 below the valve. On one side the valve is provided with an elongated curved groove 32, semi-circular in cross section and struck on an arc from the center of the valve. On the opposite side, the valve is provided with two circular ports 33 and 34. The head 10 is provided with a port 35 which opens into the outlet port 36 with which the pipe 4 connects. The head likewise has a port 37 which opens into the port 13 with which the pipe 12 connects. I also provide the head 10 with an exhaust port 38. These several ports and the groove 32 are relatively spaced and arranged so that they will assume the following operating positions. When the handle 29 is in the position of Fig. 2, the pipe 12, through ports 13, 37, groove 32 and port 38 will be open to the exhaust, while ports 34 and 35 will be in register and admit fluid pressure from below the valve to the pipe 4. This will result in the operation of the bell ringer and in the reduction of pressure above the piston 16 so that the steam will open the valve and flow through the blower line to the blower 6. In other words, both the bell ringer and blower will be in service. By moving the handle 29 to the next position shown in Fig. 3, the port 13, controlling the blower, will continue open to the exhaust and the blower will remain in service but the port 35 will be out of register with the port 34 and the fluid pressure will therefore be cut off from the bell ringer. In this position only the blower will be in service. If the handle be moved to the third position, shown in Fig. 4, the port 34 will move into register with the port 37, admitting pressure to the cylinder 15 to operate the valve 17 and cut the blower out of service, while the port 33 in the valve will move into register with the port 35 and admit pressure to the bell ringer which will alone be in service. When the handle is moved to the fourth position, shown in Fig. 5, the port 34 will remain in communication with the port 37 and hold the blower out of service, while the port 33 will have moved out of register with the port 35 and cut the bell ringer out of service. In other words, both the blower and bell ringer will be out of service.

The valve mechanism is so positioned in the cab that with one hand and without taking his eye from the track the engineer can instantaneously secure any desired operation of his bell ringer and steam blower mechanisms.

Having thus described my invention, what I claim as new and desire to secure by Letters Patent, is:—

1. A locomotive attachment comprising a controller valve adapted to be located in the cab, means to supply fluid pressure to said valve, a blower pipe for the locomotive, a fluid pressure controlled valve for controlling the flow of fluid pressure to the blower pipe, separate fluid pressure pipe lines leading from said controller valve and adapted to deliver fluid pressure to operate respectively a bell ringer and said fluid pressure controlled valve, there being a port in the casing for said controller valve for each of said pipe lines, and there being ports in the movable member of the controller valve adapted to simultaneously control the fluid pressure conditions in said several pipe lines, as and for the purposes described.

2. A locomotive attachment comprising a multi-ported valve adapted to be located in the cab and comprising a valve casing and a pipe connection therefrom to a suitable source of fluid pressure, a rotary disk valve mounted in the casing and held against its seat by the fluid pressure therein, said disk valve having ports 33, 34 extending therethrough and a curved groove in its seat face disposed on the opposite side from said ports, a multi-ported seat for the disk valve having on one side an exhaust port with which said groove is adapted to be brought into communication and adjacent thereto and on the same side thereof two ports 35, 37, said several ports and groove being so arranged relatively to each other that as the valve is moved from one operating position to another the ports 33, 34 are adapted to successively register with port 35, and port 37 adapted to successively register with port 34 and said groove, a pipe leading from port 37 adapted to deliver fluid pressure to control the operation of valve mechanism in the blower line, and a pipe leading from port 35 adapted to deliver fluid-pressure to operate a bell ringer mechanism, substantially as described.

3. A locomotive attachment comprising a valve adapted to be located in the cab and comprising a valve casing having a fluid pressure supply port, a rotary disk valve disposed within said casing, a ported seat for said valve against which said valve is held by the fluid pressure in the casing, spring means to urge said valve against its seat, means to rotate the valve, said valve and seat having each two main ports arranged equi-distant from the valve center, there being also an exhaust port in the seat and an elongated groove normally registering therewith in the face of the valve, said groove in one position of the valve establishing communication between the exhaust port and one of said main seat ports while one of the valve ports register with the other main seat port, which groove is sufficiently elongated to remain in register with the first mentioned main seat port when the valve has moved to a second operating position when it closes the other main seat port, said main ports in the valve and seat being so arranged relatively that in a third operating position of the valve the ports thereof register with the respective main seat ports in the valve seat and in a fourth operating position but one of the main valve ports registers with a port in the seat the other seat port being closed, and pipe connections adapted to lead from said valve seat ports to deliver fluid pressure to operate a bell ringer and a valve in the blower pipe of the locomotive, substantially as described.

4. A locomotive attachment comprising a controller valve adapted to be located in the cab, means to supply fluid pressure to said valve, a number of pipes leading from said controller valve, a fluid-pressure controlled valve adapted to be placed in a pipe line leading to the blower of the locomotive, a fluid-pressure operated device adapted to operate a locomotive bell, one of said pipes operatively connecting said fluid pressure controlled valve with the valve casing of the controller valve, another of said pipes operatively connecting said fluid-pressure operated device with the said casing, there being a valve port in the said casing for each of the pipes leading therefrom, and there being ports in the movable member of the controller valve adapted to simultaneously control the fluid-pressure conditions in the several pipes leading therefrom, as and for the purposes described.

In testimony whereof I have hereunto set my hand in presence of two subscribing witnesses.

HALSTEAD T. AYDELOTT.

Witnesses:
NOMIE WELSH,
R. D. JOHNSTON, Jr.